United States Patent
Tsujimoto et al.

(10) Patent No.: US 10,337,765 B2
(45) Date of Patent: Jul. 2, 2019

(54) SOLAR CELL MODULE

(71) Applicant: SANYO ELECTRIC CO., LTD., Moriguchi, Osaka (JP)

(72) Inventors: Naoki Tsujimoto, Osaka (JP); Shingo Okamoto, Toyonaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/296,494

(22) Filed: Jun. 5, 2014

(65) Prior Publication Data

US 2014/0283911 A1 Sep. 25, 2014

Related U.S. Application Data

(63) Continuation of application No. PCT/JP2013/051977, filed on Jan. 30, 2013.

(30) Foreign Application Priority Data

Feb. 3, 2012 (JP) ................. 2012-021693

(51) Int. Cl.
*F24S 40/44* (2018.01)
*H02S 30/10* (2014.01)
*F24S 25/60* (2018.01)

(52) U.S. Cl.
CPC .............. *F24S 40/44* (2018.05); *H02S 30/10* (2014.12); *F24S 2025/601* (2018.05); *Y02E 10/40* (2013.01)

(58) Field of Classification Search
CPC ...... H01L 31/0424; H02S 30/10; F24S 40/44; F24S 2025/601; Y02E 10/40
USPC .................................. 136/259, 251
See application file for complete search history.

(56) References Cited

U.S. PATENT DOCUMENTS

| | | | |
|---|---|---|---|
| 6,172,295 B1* | 1/2001 | Hattori | H01L 31/048 136/244 |
| 6,959,517 B2* | 11/2005 | Poddany | E06B 1/6015 52/173.3 |
| 2002/0029799 A1* | 3/2002 | Yoda | F24J 2/4614 136/251 |
| 2009/0050195 A1* | 2/2009 | Ogasahara | H02S 20/00 136/251 |
| 2009/0165843 A1* | 7/2009 | Horioka | F24J 2/4612 136/251 |
| 2011/0011446 A1 | 1/2011 | Hirayama | |
| 2011/0088781 A1* | 4/2011 | Yamamoto | H02S 30/10 136/259 |

FOREIGN PATENT DOCUMENTS

CN 101501865 A 8/2009
EP 2068374 A1 6/2009
(Continued)

*Primary Examiner* — Tamir Ayad
(74) *Attorney, Agent, or Firm* — Metrolexis Law Group, PLLC

(57) ABSTRACT

Provided is a solar cell module having improved weatherability. A frame body has a groove. A module main body is inserted into the groove. An adhesive material is disposed in the groove. The adhesive material is provided at least on a part of a frame body portion excluding frame body corner portions. Through holes communicating with the groove are provided at the corner portions of the frame body.

10 Claims, 4 Drawing Sheets

(56) References Cited

FOREIGN PATENT DOCUMENTS

| | | |
|---|---|---|
| JP | H06-017257 U | 3/1994 |
| JP | H6-17257 U | 3/1994 |
| JP | 2001-291889 A | 10/2001 |
| JP | 2006-286898 A | 10/2006 |
| JP | 2009-141216 A | 6/2009 |
| JP | 2011-009792 A | 1/2011 |

* cited by examiner

SOLAR CELL MODULE

CROSS REFERENCE TO RELATED APPLICATIONS

This application is a continuation application of International Application No. PCT/JP2013/051977, filed on Jan. 30, 2013, entitled "SOLAR CELL MODULE", which claims priority based on Article 8 of Patent Cooperation Treaty from prior Japanese Patent Application No. 2012-021693, filed on Feb. 3, 2012, the entire contents of which are incorporated herein by reference.

BACKGROUND

The invention relates to a solar cell module.

Patent Document 1 describes a solar cell module including: a module main body including solar cells; and a frame. In the solar cell module described in Patent Document 1, the frame is provided so as to surround the module main body. The frame is provided with a groove opened to the module main body, and the module main body is inserted in the groove. Butyl rubber is filled between the groove and the module main body.

Patent Document 1: Japanese Utility Model Registration Application Publication No. Hei 6-17257

SUMMARY

There is a demand for further improvement in weather-resistance of a solar cell module.

One aspect of the invention provides a solar cell module with an improved weather-resistance.

A solar cell module of an embodiment includes a rectangular plate-shaped module main body, a frame, and an adhesive member. The module main body includes a solar cell. The module main body includes first and second end surfaces parallel to each other and third and fourth end surfaces parallel to each other. The frame is provided so as to surround the module main body. The frame includes a groove. The module main body is inserted in the groove. The adhesive member is disposed in the groove. The adhesive member bonds the module main body and the frame to each other. The frame includes a first frame section, a second frame section, a third frame section, and a fourth frame section. The first frame section is disposed outside the first end surface. The second frame section is disposed outside the second end surface. The third frame section is disposed outside the third end surface. The third frame section includes end surfaces on both sides, one of the end surfaces facing to an end surface of the first frame section, and the other of the end surfaces facing to an end surface of the second frame section. The fourth frame section is disposed outside the fourth end surface. The fourth frame section includes end surfaces on both sides, one of the end surfaces facing to an end surface of the first frame section, and the other of the end surfaces facing to an end surface of the second frame section. The adhesive member is provided in at least part of portions of the frame except corner portions. Through holes communicating with the groove are provided in the corner portions of the frame.

According to the solar cell module, improved weather-resistance is obtained.

EMBODIMENTS

Figure 1:
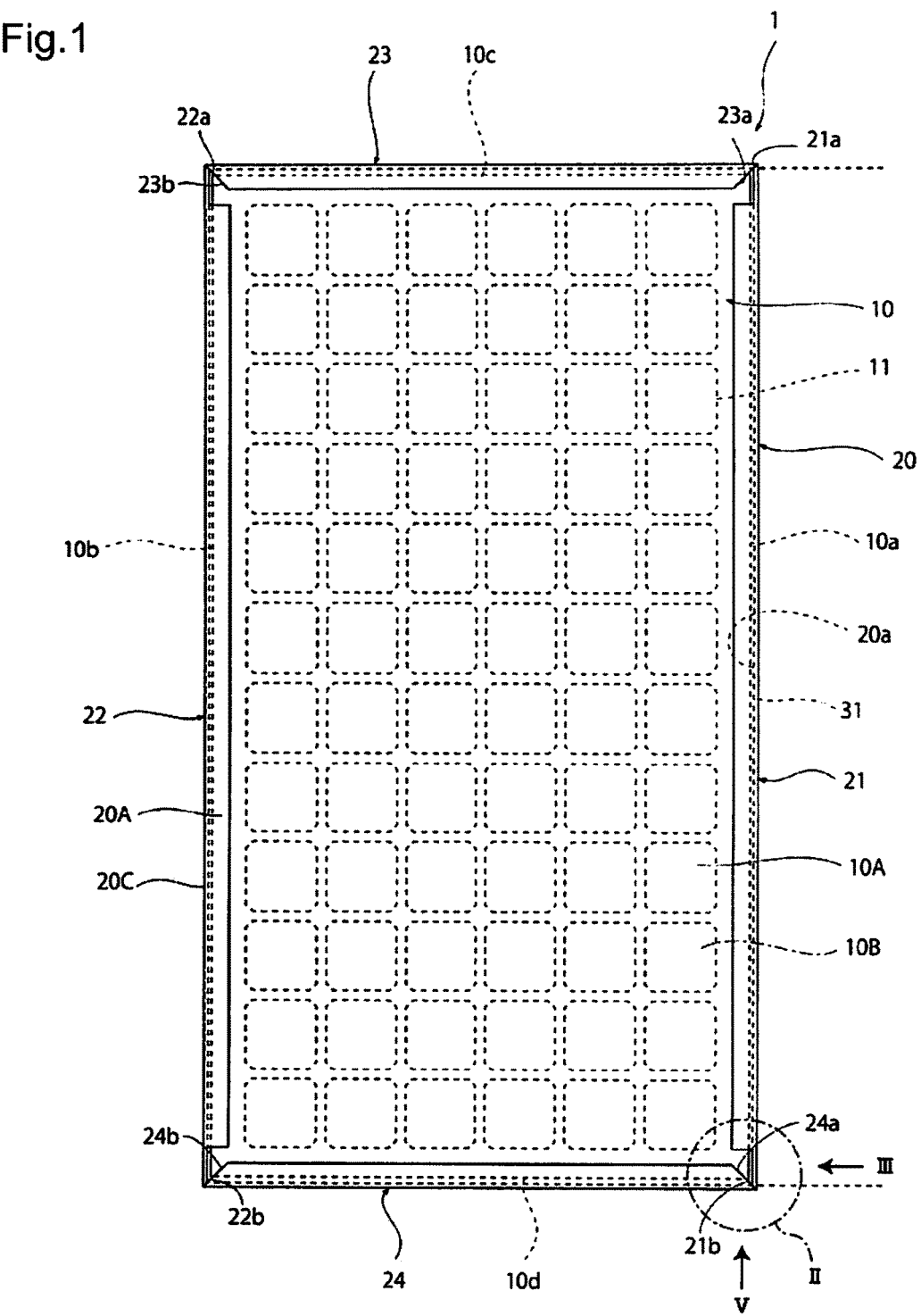
FIG. 1 is a schematic plan view of a solar cell module according to a first embodiment.

Hereinafter, an example of a preferred embodiment in which the invention is carried out is described. However, the embodiment below is merely an example. The invention is not limited to the embodiment below at all.

In addition, in each of the drawings referred to in the embodiment and the like, members with substantially the same functions are denoted by the same reference numerals. Moreover, the drawings referred to in the embodiment and the like are depicted schematically, and the ratios of dimensions and the like of objects depicted in the drawings may be different from actual ones. The ratios of dimensions and the like of objects may vary among the drawings. Specific ratios of dimensions and the like of objects should be determined in consideration of the following description.

First Embodiment

As illustrated in FIGS. 1 to 4, solar cell module 1 includes module main body 10 and frame 20. Module main body 10 includes at least one solar cell 11. Specifically, module main body 10 includes solar cells 11 electrically connected to each other with unillustrated wiring members. Solar cells 11 are disposed in a filler layer provided between a first protection member and a second protection member. Each of the first and second protection members can be made of a glass plate, a resin sheet, a resin sheet provided with a metal layer, or the like.

Module main body 10 has a rectangular shape. Module main body 10 includes first and second end surfaces 10a and 10b parallel to each other and third and fourth end surfaces 10c and 10d parallel to each other. First and second end surfaces 10a and 10b are longer than third and fourth end surfaces 10c and 10d.

Frame 20 is provided in a frame shape surrounding module main body 10. Frame 20 includes groove 20a in which an edge portion of module main body 10 is inserted.

Figure 2:
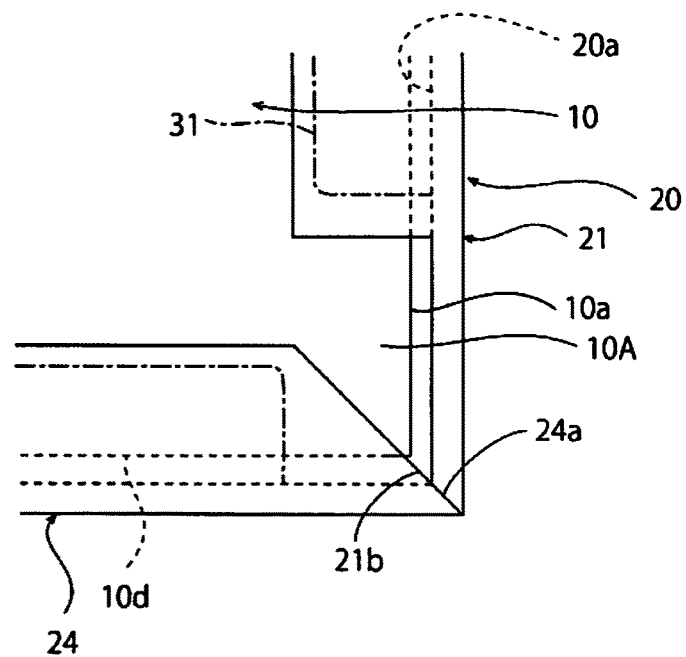
FIG. 2 is a schematic plan view of Portion II in FIG. 1.

In groove 20a, adhesive member 31 is disposed. Adhesive member 31 bonds frame 20 and module main body 10 to each other. As illustrated in FIG. 2, adhesive member 31 is provided in at least part of a region where frame 20 is provided except regions where corner portions of frame 20 are positioned.

Note that, adhesive member 31 may include, for example, a silicone resin, a silicone rubber, a butyl rubber, a pressure-sensitive adhesive agent, an adhesive member, an pressure-sensitive adhesive tape, an adhesive tape, or the like.

Frame 20 includes first frame section 21, second frame section 22, third frame section 23, and fourth frame section 24.

First frame section 21 is disposed outside first end surface 10a. First frame section 21 includes two end surfaces 21a and 21b in both end portions in an extending direction of first frame section 21. Each of two end surfaces 21a and 21b extends in a direction inclined with respect to the extending direction of first frame section 21. Specifically, each of two end surfaces 21a and 21b is formed at an angle of approximately 45 degrees with respect to an outer surface (a side surface on a side opposite to a side facing to module main body 10) of first frame section 21.

Second frame section 22 is disposed outside second end surface 10b. Second frame section 22 includes two end surfaces 22a and 22b in both end portions in an extending direction of second frame section 22. Each of two end surfaces 22a and 22b extends in a direction inclined with respect to the extending direction of second frame section 22. Specifically, each of two end surfaces 22a and 22b is formed at an angle of approximately 45 degrees with respect to an outer surface of second frame section 22.

Third frame section 23 is disposed outside third end surface 10c. Third frame section 23 includes two end surfaces 23a and 23b in both end portions in an extending direction of third frame section 23. Each of two end surfaces 23a and 23b extends in a direction inclined with respect to the extending direction of third frame section 23. Specifically, each of two end surfaces 23a and 23b is formed at an angle of approximately 45 degrees with respect to an outer surface of third frame section 23. One end surface 23a of third frame section 23 faces to one end surface 21a of first frame section 21. The other end surface 23b of third frame section 23 faces to one end surface 22a of second frame section 22.

Fourth frame section 24 is disposed outside fourth end surface 10d. Fourth frame section 24 includes two end surfaces 24a and 24b in both end portions in an extending direction of fourth frame section 24. Each of two end surfaces 24a and 24b extends in a direction inclined with respect to an extending direction of fourth frame section 24. Specifically, each of two end surfaces 24a and 24b is formed at an angle of approximately 45 degrees with respect to an outer surface of fourth frame section 24. One end surface 24a of fourth frame section 24 faces to the other end surface 21b of first frame section 21. The other end surface 24b of fourth frame section 24 faces to the other end surface 22b of second frame section 22.

By forming each of the end surfaces of the frame sections at an angle of approximately 45 degrees with respect to the outer surface of the frame section, the end surfaces facing to each other are in contact with each other without any space.

Figure 3:
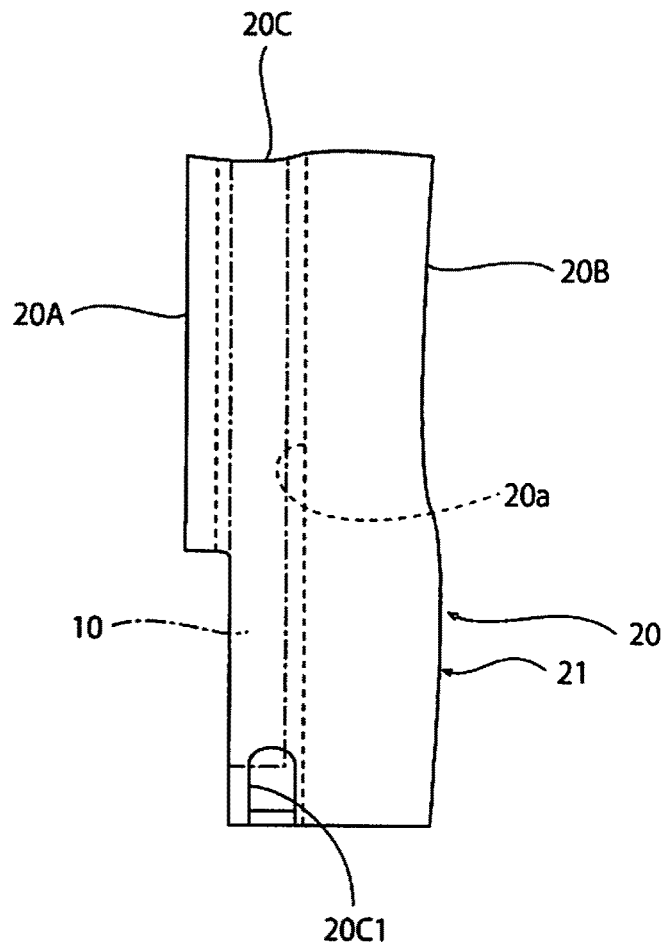
FIG. 3 is a schematic side view viewed in the direction of Arrow III in FIG. 1.
Figure 4:
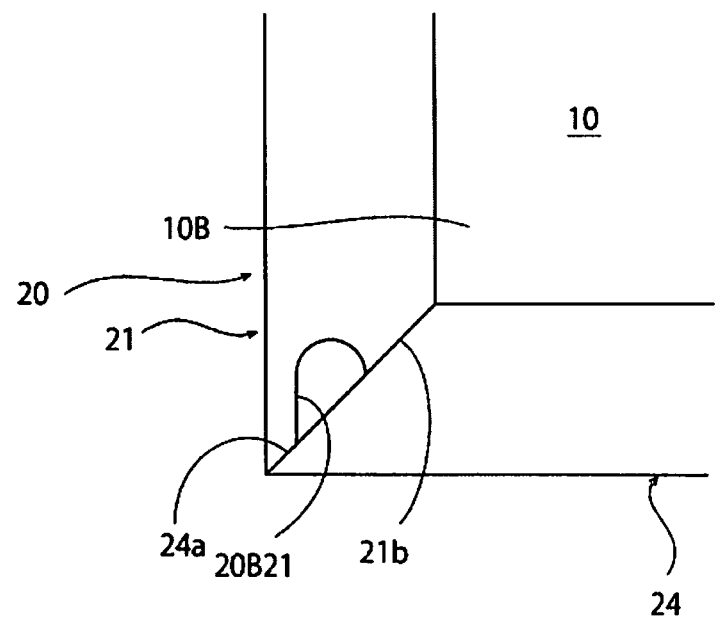
FIG. 4 is a schematic back surface side view of Portion II in FIG. 1.

Each of first to fourth frame sections 21 to 24 includes first portion 20A disposed above an edge portion of principal surface 10A on a light-receiving surface side of module main body 10, second portion 20B disposed above an edge portion of principal surface 10B on aback surface side of module main body 10, and third portion 20C connecting first portion 20A and second portion 20B to each other (see FIG. 3). First to third portions 20A, 20B, and 20C constitute groove 20a.

As illustrated in FIGS. 1 and 2, first portion 20A is not provided in at least part of each of the four corner portions of frame 20. Specifically, in first portion 20A of each of first and second frame sections 21 and 22, removed portions are provided respectively in both end portions in the extending direction of the first and second frame sections 21 and 22. First portion 20A of each of first and second frame sections 21 and 22 has a rectangular shape, and the lengths of first portions 20A in the extending direction thereof are smaller than the lengths of the first and second frame sections 21 and 22 in the extending direction thereof. The lengths of first portions 20A of first and second frame sections 21 and 22 in the extending direction thereof are set so that the both end portions of first portions 20A in the extending direction thereof do not come into contact with third and fourth frame sections 23 and 24. In the regions where the removed portions are formed, adhesive member 31 is not provided.

Figure 5:
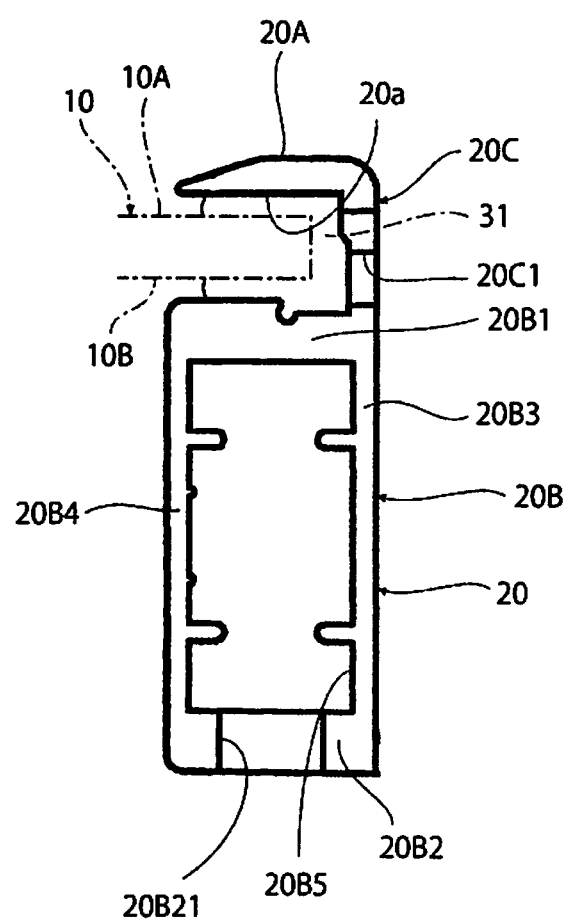
FIG. 5 is a schematic side view viewed in the direction of Arrow V in FIG. 1.

As illustrated in FIGS. 3 and 5, first through hole 20C1 communicating with groove 20a is provided in third portion 20C in each of the four corner portions of frame 20 where adhesive member 31 is not provided. Specifically, first through hole 20C1 is provided in each of the both end portions of first and second frame sections 21 and 22 in the extending direction thereof. First through holes 20C1 are formed by notches opened in end surfaces of first and second frame sections 21 and 22 in the extending direction thereof. The notches extend in the extending direction of the first and second frame sections 21 and 22 from the end surfaces of first and second frame sections 21 and 22 to positions where the module main body 10 is disposed. Each of the notches is preferably formed such that a lower edge of the notch can be positioned lower than the back surface of module main body 10. First through hole 20C1 is not provided in any of third and fourth frame sections 23 and 24. Note that a lower position here is a position in a direction extending from the light-receiving surface side to the back surface side of module main body 10, and the lower edge of the notch is an edge of the notch on the lower side.

As illustrated in FIG. 5, second portion 20B is provided with hollow portion 20B5 penetrating each of frame sections 21 to 24 in the extending direction thereof. Hollow portion 20B5 has a rectangular cross sectional shape taken perpendicularly to the extending direction of the corresponding one of frame sections 21 to 24 and includes first to fourth wall portions 20B1 to 20B4. In other words, groove 20a is formed by first portion 20A, first wall portion 20B which forms an upper wall portion of second portion 20B, and third portion 20C. Second wall portion 20B2, which forms a bottom wall portion, is provided with second through hole 20B21 communicating with hollow portion 20B5. By through second through hole 20B21, water entering the inside of hollow portion 20B5 is drained. Note that second through hole 20B21 is provided in each of the end portions of first and second frame sections 21 and 22 in the extending direction thereof in the corner portions of frame 20. Second through hole 20B21 extends in the extending direction of first and second frame sections 21 and 22 from each of the end surfaces of first and second frame sections 21 and 22 to a predetermined position.

Here, when the frame includes four frame sections, it is necessary to prevent deterioration of the appearance of the solar cell module due to extrusion of the adhesive member from spaces between the frame sections. In this respect, it is conceivable that no adhesive member is provided in the corner portions of the frame. However, in this case, spaces where neither the module main body nor the adhesive member is present are formed in the groove in the corner portions of the frame. When water is accumulated in these spaces, the water may enter the module main body and deteriorate characteristics of the solar cell module.

In this respect, first through holes 20C1 communicating with groove 20a are provided in solar cell module 1. Hence, even when water enters groove 20a, the water is drained through first through holes 20C1. Hence, water is less likely to be accumulated in groove 20a. Accordingly, it is possible to suppress the entering of water to the inside of module main body 10. As a result, solar cell module 1 can be achieved with an improved weather-resistance.

Moreover, in solar cell module 1, first portions 20A are not provided in at least part of the corner portions of frame 20. For this reason, water on principal surface 10A is drained from principal surface 10A through the regions where first portion 20A is not provided. Hence, water is less likely to be accumulated on principal surface 10A.

Specifically, in first portions 20A of first and second frame sections 21 and 22, removed portions are provided in both end portions of first and second frame sections 21 and 22 in the extending direction thereof. Hence, water between principal surface 10A and first portion 20A of first frame section 21, first portion 20A of each of third and fourth frame sections 23 and 24 can be drained through the removed portion. Likewise, water between principal surface 10A and first portion 20A of second frame section 22, first portion 20A of each of third and fourth frame sections 23 and 24 can be drained through the removed portion. By employing such a configuration, not only water accumulated near first and second frame sections 21 and 22 is efficiently drained, but also water accumulated near third and fourth frame sections 23 and 24 is efficiently drained.

Moreover, in solar cell module 1, adhesive member 31 is not provided in at least a region in the corner portions where first portions 20A are not provided. Hence, unlike the case where an adhesive member raised from the principal surface is present, drainage of water on principal surface 10A is not inhibited. Hence, water is further less likely to be accumulated on principal surface 10A. As described above, when adhesive member 31 is not provided in the corner portions to improve the drainage of water on principal surface 10A, it is more effective to promote the drainage of water in groove 20a by providing first through holes 20C1.

In solar cell module 1, first through holes 20C1, removed portions, and hollow portions 20B5 are provided only in first and second frame sections 21 and 22 among first to fourth frame sections 21 to 24. Hence, it is not necessary to conduct processes for providing the through holes and the like in third and fourth frame sections 23 and 24. Accordingly, frame 20 can be manufactured easily through fewer manufacturing processes. Moreover, second through holes 20B21 are also provided in only first and second frame sections 21 and 22, and are not provided in any of third and fourth frame sections 23 and 24. Hence, frame 20 can be manufactured easily by fewer manufacturing processes.

The notches constituting the first through holes 20C1 and the notches constituting second through holes 20B21, which are provided in first and second frame sections 21 and 22, are opened in the end surfaces of the first and second frame sections 21 and 22 in the extending direction thereof. In other words, the notches are opened to third and fourth frame sections 23 and 24. By employing such a configuration, not only water accumulated in groove 20a and hollow portions 20B5 of first and second frame sections 21 and 22 is efficiently drained, but also water accumulated in groove 20a and hollow portions 20B5 of third and fourth frame sections 23 and 24 is efficiently drained.

Figure 6:
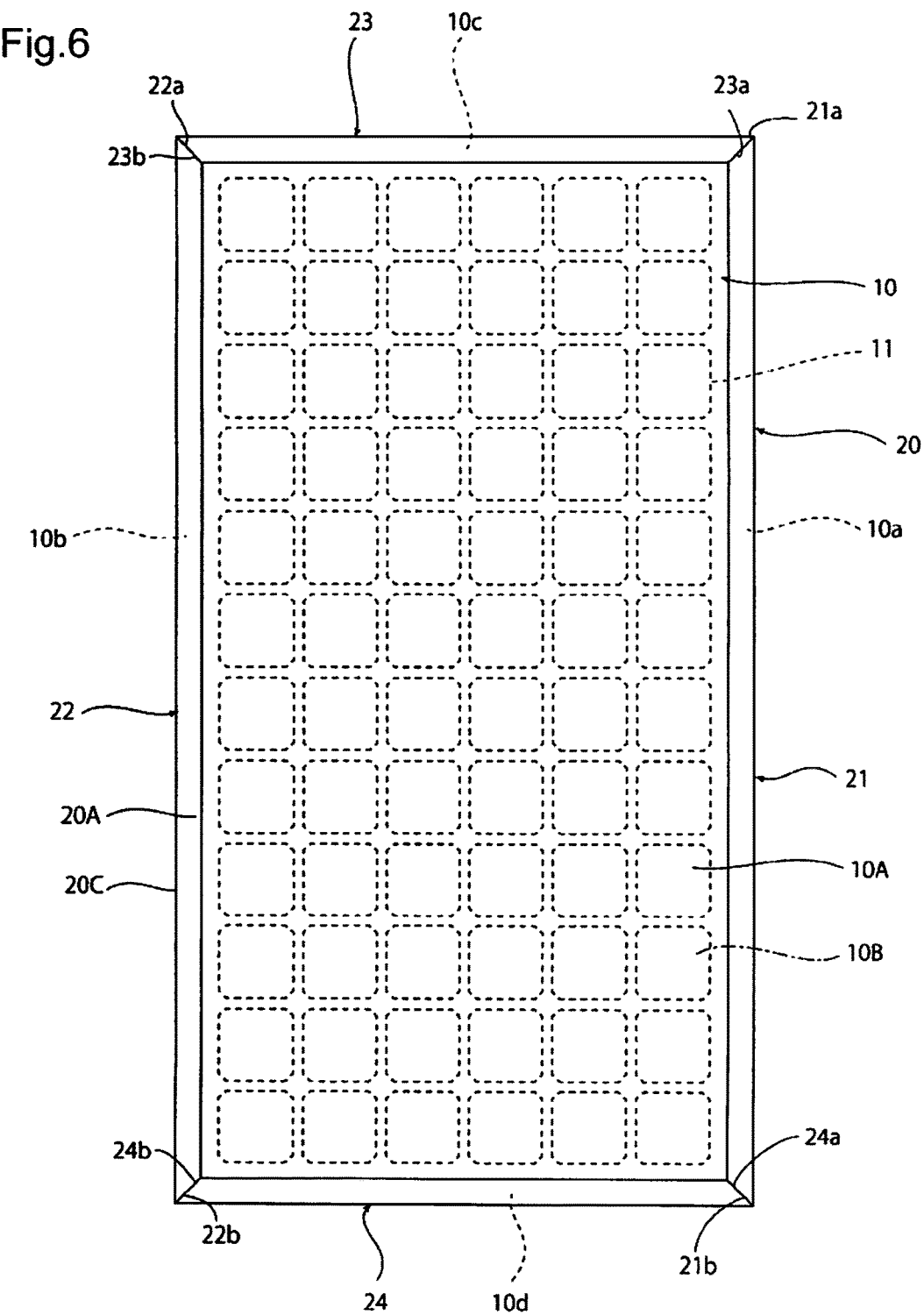
FIG. 6 is a schematic plan view of a solar cell module according to a second embodiment.

Note that, in solar cell module 1, the removed portions are provided in the both end portions of first and second frame sections 21 and 22 in the extending direction thereof, and first portion 20A is not provided in at least part of each of the four corner portions of frame 20, as described above. However, the invention is not limited to this configuration. For example, as illustrated in FIG. 6, it is also possible to provide the removed portion in none of first to fourth frame sections 21 to 24.

The invention claimed is:

1. A solar cell module comprising:
    a rectangular plate-shaped module main body including a solar cell, first and second end surfaces parallel to each other, and third and fourth end surfaces parallel to each other;
    a frame provided so as to surround the module main body and including a groove into which the module main body is inserted; and
    an adhesive member disposed in the groove and bonding the module main body and the frame to each other, wherein
    the frame includes:
        a first frame section disposed outside the first end surface and including longitudinal end surfaces thereof;
        a second frame section disposed outside the second end surface and including longitudinal end surfaces thereof;
        a third frame section disposed outside the third end surface and including longitudinal end surfaces on both longitudinal ends of the third frame section, one of the longitudinal end surfaces facing to one of the longitudinal end surfaces of the first frame section, the other of the longitudinal end surfaces facing to one of the longitudinal end surfaces of the second frame section;
        a fourth frame section disposed outside the fourth end surface and including longitudinal end surfaces on both longitudinal ends of the fourth frame section, one of the longitudinal end surfaces facing to the other longitudinal end surface of the first frame section, the other of the longitudinal end surfaces facing to the other longitudinal end surface of the second frame section; and
        four corner portions at which adjacent two of the first, second, third, and fourth frame sections intersect with each other,
    the frame comprises:
        a first portion disposed above one principal surface side of the module main body;
        a second portion disposed below another principal surface side of the module main body; and
        a third portion connecting the first portion and the second portion and constituting the groove with the first and second portions, such that the groove is defined by the first portion, the second portion, and the third portion, and the second portion provided below the groove is formed with a hollow section,
    the adhesive member is provided in at least part of a region where the groove is provided except one of the corner portions of the frame and thereby forming a space, where the adhesive member is not provided in the groove, in the one of the corner portions,
    the one of the corner portions of the frame includes, at the third portion of the frame, a through hole communicating an exterior of the frame directly with the space in the groove, in such a manner that the through hole comprises a notch opened in a longitudinal end surface of a corresponding one of the frame sections, and
    the one of the corner portions of the frame includes, at the first portion of the frame, a removed portion communicating an exterior of the frame directly with the space in the groove, in such a manner that the removed portion comprises a notch opened in the longitudinal end surface of the corresponding one of the frame sections, such that the through hole and the removed portion are provided adjacent to each other.

2. The solar cell module according to claim 1, wherein the through hole includes a plurality of through holes respectively provided in the corner portions, and the plurality of through holes are provided in the longitudinal end surfaces of each of the first and second frame sections but are not provided in any of the third and fourth frame sections.

3. The solar cell module according to claim 1, wherein the through hole includes a plurality of through holes respectively provided in the corner portions, and the plurality of through holes comprise notches opened in one of the longitudinal end surfaces of each of the frame sections.

4. The solar cell module according to claim 1, wherein
each of the longitudinal end surfaces of the first frame section is inclined at an angle with respect to the longitudinal direction of the first frame section,
each of the longitudinal end surfaces of the second frame section is inclined at an angle with respect to the longitudinal direction of the second frame section,
each of the longitudinal end surfaces of the third frame section is inclined at an angle with respect to the longitudinal direction of the third frame section, and
each of the longitudinal end surfaces of the fourth frame section is inclined at an angle with respect to the longitudinal direction of the fourth frame section.

5. The solar cell module according to claim 1, wherein
each of the longitudinal end surfaces of the first frame section is inclined at an angle of approximately 45 degree with respect to the longitudinal direction of the first frame section,
each of the longitudinal end surfaces of the second frame section is inclined at an angle of approximately 45 degree with respect to the longitudinal direction of the second frame section,
each of the longitudinal end surfaces of the third frame section is inclined at an angle of approximately 45 degree with respect to the longitudinal direction of the third frame section, and
each of the longitudinal end surfaces of the fourth frame section is inclined at an angle of approximately 45 degree with respect to the longitudinal direction of the fourth frame section.

6. The solar cell module according to claim 4, wherein the longitudinal end surfaces of the frame sections facing to each other are in contact with each other.

7. The solar cell module according to claim 1, wherein
the adhesive member in the groove is not provided between the through hole provided at the third portion and the removed portion at the first portion in the one of corner portions of the frame.

8. The solar cell module according to claim 1, wherein
the one of the corner portions of the frame includes, at a bottom wall of the hollow section, a second through hole communicating an exterior of the frame directly with a space in the hollow section, in such a manner that the second through hole comprises a notch opened in the longitudinal end surface of the corresponding one of the frame sections.

9. The solar cell module according to claim 1, wherein
the through hole is provided at each of both longitudinal end surfaces of the first and second frame section, and
the removed portion is provided at each of both longitudinal end surfaces of the first and second frame section.

10. The solar cell module according to claim 8, wherein
the through hole is provided at each of both longitudinal end surfaces of the first and second frame sections,
the removed portion is provided at each of both longitudinal end portions of the first and second frame sections, and
the second through hole is provided at each of both longitudinal end surfaces of the first and second frame sections.

\* \* \* \* \*